United States Patent Office 2,814,722
Patented Nov. 26, 1957

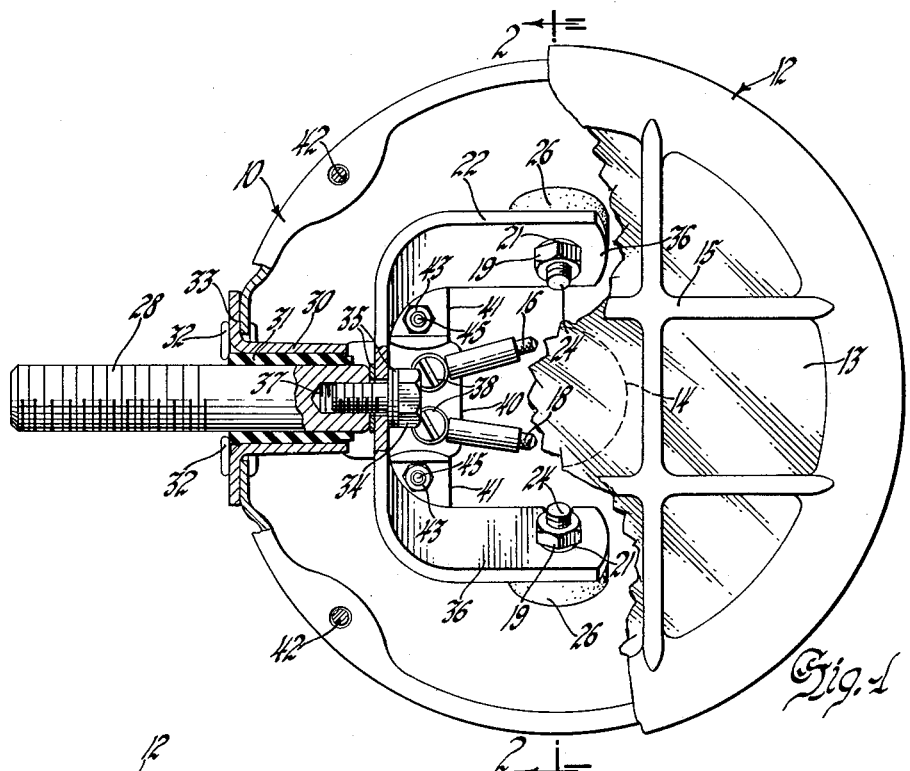
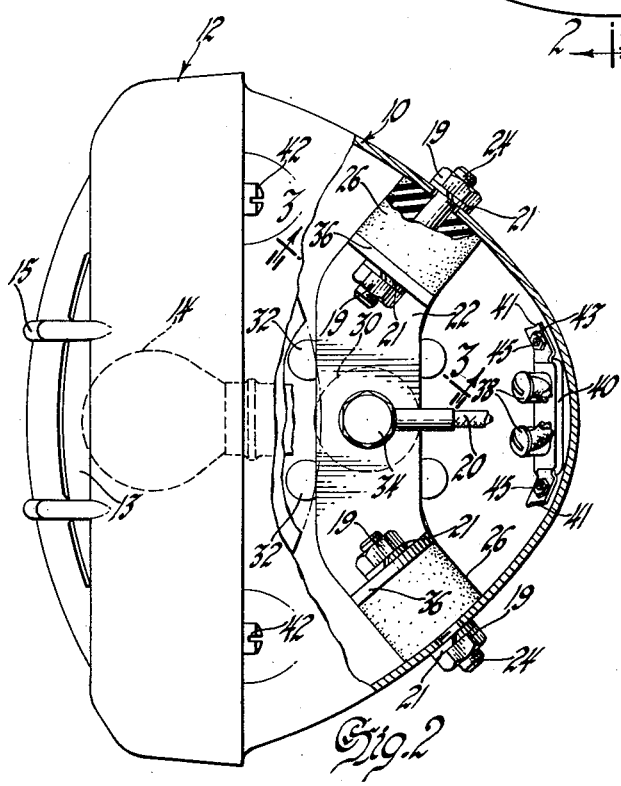
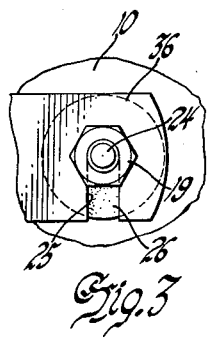

2,814,722

RESILIENT LAMP MOUNTING

John H. Diedring, Anderson, Ind., assignor to General Motors Corporation, Detroit, Mich., a corporation of Delaware Application June 29, 1953, Serial No. 364,783

7 Claims. (Cl. 240—90)

This invention relates to vehicle headlamp constructions and more particularly to shock absorbing mountings adapted for headlamps used on tractors, military equipment or other vehicles subjected to extreme vibrational jars and shock in operation.

It is well known that various parts of vehicles are subjected to a wide variety of vibrational stresses during operation. The difficulty caused by vibrational stresses is greatly multiplied in the case of heavy duty equipment such as tractors and military vehicles that travel across country rather than over smooth improved roads. Perhaps most adversely affected by the shock and impact are the vehicle headlamps. Vibrational shock impairs the carefully adjusted accurate aim of the headlamp which is critical if the proper beam pattern is to be maintained. Moreover, in many instances the headlamp is structurally damaged as well, particularly the bulb filaments and electrical wiring connections.

In the past, numerous attempts have been made to overcome the problem of lamp vibration. Typical of prior suggestions is the use of rubber or the like bonded as a cushion between the supporting bolts securing the lamp to the vehicle. The resiliency of the rubber naturally absorbs a great deal of the impact of the vibrations. However, when a headlamp is so positioned that its mounting bolt is disposed in a horizontal plane, as is the case with so-called side-mounted lamps, there is a considerable amount of shearing stress on the mounting bolt due to the unbalanced condition of the lamps. As a result, not only does the light beam pattern gyrate objectionably but the likelihood of structural damage is greatly increased. Inasmuch as the lens, reflector and associated structure are positioned in front of the lamp housing member, the weight thereof is necessarily unevenly distributed, thus increasing the vibrational and torsional stress imposed on the cantilever type mounting bolt.

Accordingly, it is a principal object of the present invention to provide a novel form of shock absorbing headlamp mounting that will minimize or entirely eliminate objectionable lamp vibrations.

A further object is the provision of a shock absorbing headlamp mounting adapted to resist torsional as well as other vibrational stresses encountered in operation of vehicles over rough terrain. A still further object is the provision of a novel shock absorbing headlamp mounting adapted to provide improved resiliency in all planes when the lamp mounting bolt is disposed horizontally.

These and other objects are attained in accordance with this invention by providing resilient means within the headlamp housing to minimize vibration of the lamp, said means comprising a spring type mounting bracket resiliently secured within said housing. A preferred mounting comprises a U-shaped member adapted to engage, through its apex, one end of a cantilever support member, typically the horizontally disposed lamp mounting bolt, and to be resiliently secured to the interior of the lamp housing. In a preferred embodiment, such a U-shaped mounting bracket is rigidly secured to a cantilever type lamp mounting bolt having a resilient sleeve extending around a portion of its length.

Other objects and advantages of this invention will more fully appear from the following description of a preferred embodiment of the invention as illustrated in the accompanying drawing, in which:

Fig. 1 is a plan view, partially in section and with parts broken away, of a vehicle headlamp embodying the invention;

Fig. 2 is a view, partially in section and with parts broken away, taken substantially along line 2—2 of Fig. 1; and Fig. 3 is a fragmentary plan view taken substantially along line 3—3 of Fig. 2.

Referring more particularly to the drawing, a preferred embodiment of a vehicle headlamp in accordance with the present invention includes a housing member 10 having a door 12, provided with a lens guard structure 15, secured thereto by a plurality of machine screws 42 disposed around the periphery of the housing. Disposed within the housing 10 and secured to the interior of said door 12 is a sealed lighting unit having a lens 13, a bulb 14, and connected through a conventional type three-prong socket (not shown) to electrical lead wires 16, 18 and 20. These electrical leads are connected into the vehicle lighting circuit through machine screw contacts 38 in a terminal plate 40 which is secured within the housing by clips 41 held in place by nuts 43 and bolts 45, and by an electrical ground connection through machine screw 34.

A lamp mounting bolt 28 serving as a cantilever support for said lamp extends within lamp housing 10 through a supporting tube 30 which is secured to the base of the lamp housing by a plurality of rivets 32 extending through an outwardly extending flanged portion 33 of the supporting tube. A resilient tubular member or sleeve 31 of rubber or the like, adapted to resist torsional, vibrational and shear stresses is provided in the annular space between the stationary supporting member, mounting bolt 28, and supporting tube 30.

In accordance with the present invention an improved resistance to vibrational shock is provided by a spring type mounting bracket 22 which is disposed within the lamp housing 10 and secured to the inner surface thereof by nuts 19 which threadedly engage opposite ends of bolts 24 and are tightened against lock washers 21. Disposed around bolts 24 between the ends of the mounting bracket 22 and the lamp housing 10 are resilient mounting cylinders 26 formed of rubber or the like and adapted to provide compression resilience to minimize transmission of vibrational shock to the headlamp. The mounting bracket 22, formed of steel or the like, typically from 1/8" by 1" flat stock, is a generally U-shaped member secured through its apex to one end of the mounting bolt 28 by a machine screw 34 which is threadedly engaged in opening 37, and is tightened against lock washers 35. The end portions of the bracket 22 are turned to provide surfaces 36 approximately at right angles to each other and each substantially perpendicular to the plane of the bracket apex.

The ability of the lamp mounting of my invention to substantially completely isolate the housing 10 and the lighting unit positioned therein from the effects of shock and vibration may be readily understood from an examination of the dynamics of the mounting structure. As is clearly shown in Figure 1, the housing 10 is sleevedly positioned about the stationary supporting member, mounting bolt 28, with the resilient tubular member 31 therebetween. In such a relationship, the member 31 would be subjected to large torsional, shear and compression stresses which would in turn be transmitted to the housing 10. However, all stresses excepting only those in compression are substantially eliminated by attaching the mounting bracket 22 to the inner end of bolt 28 and by attaching the two ends of the bracket to the housing, resilient mounting cylinders 26 being interposed between the housing and the bracket ends. In this manner, the housing 10 is effectively secured in a resilient manner to the inner end of the bolt 28 thus precluding relative axial movement with respect to the bolt, between the housing and the bolt to substantially eliminate the transmission of any stresses in torsion or shear. Thus, only compression stress is transmitted to resilient members 26 and 31 and ince resilient mounting members of these types are most efficient in absorbing stresses in compression, the housing 10 and the lighting unit are effectively isolated from shock and vibration.

It will be understood, of course, that a particular application will present its own peculiar problems as to the amount of damping required by size and weight of headlamp, the shock or impact vibrations likely to be encountered, as well as by the rotational stresses. Accordingly, the size, thickness, resiliency and composition of the mounting cylinders 26 and the tubular sleeve 31 will be dictated by the characteristics desired in a particular headlamp mounting. As shown in Fig. 3, the ends of the mounting bracket are provided with slots 25 to facilitate assembly and adjustment.

From the foregoing description, it will now be understood that a lamp structure formed in accordance with the present invention embodies an improved headlamp mounting utilizing resilient cylindrical mounting members disposed within the lamp housing itself to provide resiliency in all planes to minimize beam gyration and structural damage from vibrational shock and impact. The improved resiliency is even more pronounced in the preferred embodiment of the invention as shown in the drawing wherein the headlamp is provided with internal resilient mounting as well as a resilient sleeve surrounding the cantilever type mounting bolt.

The expression "sealed lighting unit" as used in the specification and claims is intended of course to include various types and sizes of sealed lamp structures such as the so-called sealed-beam lamp units.

Although the invention has been described with specific reference to particular embodiments thereof, it is not to be so limited since changes and alterations therein may be made which are within the full intended scope of this invention as defined by the appended claims.

What is claimed is:

1. In a mounting for headlamps, the combination of a headlamp housing, a tubular member secured to said housing and extending therein, a stationary supporting member extending within said tubular member, a resilient sleeve disposed between and in intimate contact with said tubular member and supporting member, additional supporting means secured to the end of said stationary supporting member extending through said tubular member, said additional supporting means having additional resilient mounting means for securing said stationary support member to said headlamp housing, the outer and inner surfaces of said sleeve contacting said tubular and supporting members being substantially coextensive and said additional resilient mounting means being adapted to absorb substantially all vibration in compression.

2. In a headlamp structure of the type comprising a lamp housing and having a stationary cantilever mounting bolt extending through a tubular member into said housing, the improvement which consists in providing a resilient sleeve within said tubular member, said resilient sleeve being intimately bonded both to said mounting bolt and to said tubular member, and a U-shaped mounting bracket secured to said mounting bolt through its apex, the ends of said U-shaped bracket being secured to said housing through cylindrical resilient members having axes substantially perpendicular to each other.

3. In a sealed beam vehicle headlamp of the type comprising a housing member and an annular closure for said housing member having lens protective means thereon, the improvement which consists in cushioning a sealed lighting unit within said housing member by providing resilient mounting means adapted to provide a compression resilience in three planes substantially all at right angles to each other, said means comprising a supporting tube secured within an opening in the housing, a stationary support for said housing positioned within said tube, a resilient sleeve around said stationary support member, a spring type mounting bracket secured to one end of said stationary support member and also to at least two spaced points on the interior of said lamp housing, and resilient cylindrical members positioned between said mounting bracket and said lamp housing.

4. A cantilever supporting structure comprising an elongated stationary support, a resilient tubular sleeve positioned on said support adjacent one end thereof, the inner wall surface of said sleeve being in contact with the outer wall surface of said support, a tubular member positioned about said sleeve, the inner wall surface of said member being in contact with the outer wall surface of said sleeve, a mounting bracket attached to the end of said support adjacent said tubular member, and a resilient mounting member attached to said bracket, said tubular member and said resilient mounting member being adapted to be secured to a supported member, the axes of said tubular member and said resilient mounting member being substantially at right angles to each other.

5. A device as set forth in claim 4 wherein said bracket is attached at a point between the ends thereof and having a resilient mounting member attached thereto adjacent each end, the axes of said resilient mounting members being substantially at right angles to each other.

6. A device as set forth in claim 5 wherein said bracket is generally U-shaped.

7. In a vehicle headlamp comprising a lamp housing, a lighting unit positioned within said housing, a tubular member positioned within an opening within said housing, and a stationary mounting member extending through said tubular member and into said housing, the improvement which consists in providing a resilient sleeve within said tubular member, the inner and outer wall surfaces of said sleeve being intimately bonded to said mounting member and to said tubular member, a mounting bracket secured to the end of said mounting member on the inside of said housing, and resilient mounting members secured to the ends of said bracket, the ends of said bracket being secured to said housing through said resilient mounting members which are adapted to absorb substantially all vibration in compression.

References Cited in the file of this patent

UNITED STATES PATENTS

| | | |
|---|---|---|
| 1,007,952 | Jackson | Nov. 7, 1911 |
| 2,019,052 | Lord | Oct. 29, 1935 |
| 2,620,434 | Edmunds | Dec. 2, 1952 |
| 2,724,770 | Onksen | Nov. 22, 1955 |

FOREIGN PATENTS

| | | |
|---|---|---|
| 416,828 | France | Aug. 6, 1910 |
| 724,246 | France | Jan. 25, 1932 |
| 164,350 | Switzerland | Dec. 1, 1933 |
| 457,958 | Great Britain | Dec. 9, 1936 |
| 601,499 | Great Britain | May 6, 1948 |